United States Patent
Ragnoli et al.

(10) Patent No.: US 11,294,727 B2
(45) Date of Patent: Apr. 5, 2022

(54) RESOLVING CRYPTOGRAPHIC BOTTLENECKS FOR DISTRIBUTED MULTI-SIGNATURE CONTRACTS SHARED WITH CRYPTOGRAPHIC ACCELERATORS BY SWITCHING BETWEEN LOCAL AND ACCELERATOR CRYPTOGRAPHIC LIBRARIES

(71) Applicant: INTERNATIONAL BUSINESS MACHINES CORPORATION, Armonk, NY (US)

(72) Inventors: Emanuele Ragnoli, Mulhuddart (IE); Mustafa Rafique, Dublin (IE); John Sheehan, Dublin (IE); Kevin Reilly, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 203 days.

(21) Appl. No.: 16/365,136

(22) Filed: Mar. 26, 2019

(65) Prior Publication Data
US 2020/0310875 A1   Oct. 1, 2020

(51) Int. Cl.
| | | |
|---|---|---|
| *G06F 9/50* | (2006.01) | |
| *G06F 9/38* | (2018.01) | |
| *G06F 9/30* | (2018.01) | |
| *H04L 9/06* | (2006.01) | |
| *H04L 9/32* | (2006.01) | |

(52) U.S. Cl.
CPC .......... *G06F 9/505* (2013.01); *G06F 9/30021* (2013.01); *G06F 9/3877* (2013.01); *H04L 9/0637* (2013.01); *G06F 9/5044* (2013.01); *G06F 2209/509* (2013.01); *H04L 9/3239* (2013.01); *H04L 9/3255* (2013.01); *H04L 2209/38* (2013.01); *H04L 2209/68* (2013.01)

(58) Field of Classification Search
None
See application file for complete search history.

(56) References Cited

U.S. PATENT DOCUMENTS

| | | | |
|---|---|---|---|
| 6,412,069 B1 * | 6/2002 | Kavsan | ........ G06F 8/60 713/164 |
| 6,704,871 B1 * | 3/2004 | Kaplan | ........ G06F 21/72 713/192 |
| 7,191,341 B2 | 3/2007 | Paaske et al. | |

(Continued)

OTHER PUBLICATIONS

Gadriwala et al. "Accelerating Poly1305 cryptographic message authentication on the z14." Proceedings of the 27th Annual International Conference on Computer Science and Software Engineering. IBM Corp., 2017 (8 Pages).

(Continued)

*Primary Examiner* — Michael W Ayers
(74) *Attorney, Agent, or Firm* — Griffiths & Seaton PLLC

(57) ABSTRACT

Various embodiments are provided for managing cryptographic bottlenecks for distributed multi-signature blockchain contracts in a computing environment. One or more cryptographic bottlenecks of cryptographic requests at a cryptographic accelerator may be resolved by switching between a blockchain node cryptographic library and an accelerator cryptographic library upon a number of the cryptographic requests at the accelerator exceeding a defined threshold.

17 Claims, 7 Drawing Sheets

(56) References Cited

U.S. PATENT DOCUMENTS

| | | | |
|---|---|---|---|
| 7,870,395 B2 | 1/2011 | Dewkett et al. | |
| 8,266,422 B2* | 9/2012 | Liu | H04L 63/0485 |
| | | | 713/151 |
| 10,761,877 B2* | 9/2020 | Peffers | G06F 9/466 |
| 2004/0117614 A1* | 6/2004 | Minnick | H04L 63/0428 |
| | | | 713/153 |
| 2005/0071651 A1* | 3/2005 | Aguilar, Jr. | G06F 21/6236 |
| | | | 713/189 |
| 2008/0181399 A1* | 7/2008 | Weise | H04L 9/0877 |
| | | | 380/44 |
| 2018/0006806 A1* | 1/2018 | Wang | G09C 1/00 |
| 2018/0109541 A1 | 4/2018 | Gleichauf | |
| 2019/0028276 A1* | 1/2019 | Pierce | G06Q 20/02 |
| 2019/0132295 A1* | 5/2019 | Lenz | G06F 21/64 |
| 2020/0412521 A1* | 12/2020 | Shi | G06Q 20/3674 |

OTHER PUBLICATIONS

Kramer et al. "A general purpose hypertransport-based application accelerator framework." (Proceedings of the First International Workshop on HyperTransport Research and Applications (WHTRA2009) Feb. 12, 2009, Mannheim, Germany (10 Pages).

* cited by examiner

RESOLVING CRYPTOGRAPHIC
BOTTLENECKS FOR DISTRIBUTED
MULTI-SIGNATURE CONTRACTS SHARED
WITH CRYPTOGRAPHIC ACCELERATORS
BY SWITCHING BETWEEN LOCAL AND
ACCELERATOR CRYPTOGRAPHIC
LIBRARIES

BACKGROUND OF THE INVENTION

Field of the Invention

The present invention relates in general to computing systems, and more particularly to, various embodiments for managing and resolving cryptographic bottlenecks for distributed multi-signature blockchain contracts by a processor.

Description of the Related Art

In today's society, consumers, business persons, educators, and others use various computing network systems with increasing frequency in a variety of settings. Computer systems may be found in the workplace, at home, or at school. Computer systems may include data storage systems, or disk storage systems, to process and store data. In recent years, both software and hardware technologies have experienced amazing advancement. With the new technology, more and more functions are added, and greater convenience is provided for use with these computing systems.

SUMMARY OF THE INVENTION

Various embodiments for resolving cryptographic bottlenecks for distributed multi-signature contracts shared with cryptographic accelerators using one or more processors in a computing environment are provided. In one embodiment, by way of example only, a method managing cryptographic bottlenecks for distributed multi-signature blockchain contracts, again by a processor, is provided. One or more cryptographic bottlenecks of cryptographic requests at a cryptographic accelerator may be resolved by switching between a blockchain node cryptographic library and an accelerator cryptographic library upon a number of the cryptographic requests at the accelerator exceeding a defined threshold.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
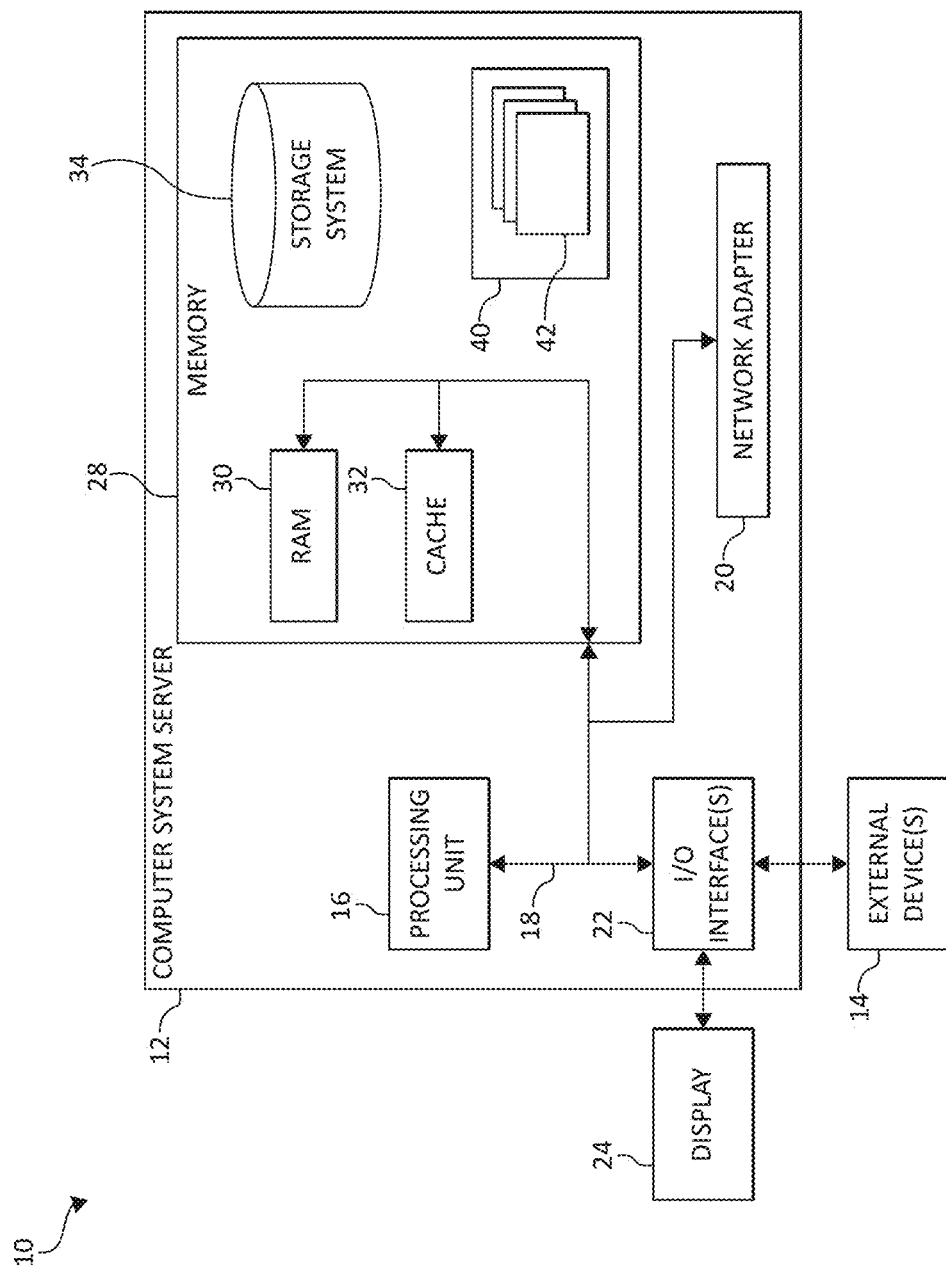
FIG. 1 is a block diagram depicting an exemplary computing node according to an embodiment of the present invention.

A blockchain is a distributed database that may be used to maintain a transaction ledger. A transaction ledger may denote an ordered set of transactions that have been validated or confirmed within a system up to a certain point in time. A transaction ledger may include a continuously-growing list of data records, where each data record may include data relating to one transaction. Further, encryption and other security measures may be used to secure the transaction ledger from tampering and revision. The blockchain may include a number of blocks, each block holding one or more individual transactions or data records. Further, each block may contain a timestamp and a link to a previous block. A blockchain network may be used and enabled users may be allowed to connect to the network, send new transactions to the blockchain, verify transactions, and/or create new blocks.

Moreover, in distributed systems such as, for example, a blockchain system, the blockchain makes intensive usage of cryptographic libraries to run consensus operation or perform multi-signatures contracts ("M-out-of-N" contracts). An M-out-of-N contract is a transaction on the blockchain that requires a signature of M nodes and a verification from N nodes. Blockchain nodes can enhance their cryptographic skills with crypto accelerators embedded on the same blockchain nodes. With permission, one or more blockchain cryptographic accelerators can be offered as a service to the blockchain nodes on the infrastructure that hosts the same blockchain (i.e., a supercomputer or a mainframe. While this is intended to accelerate the throughput of the system, in the case of M-out-of-N contracts, it can result in the crypto accelerator becoming a network bottleneck, reducing the throughput of the system. A multi-signature contracts needs to be signed by M nodes and verified by all N nodes on the blockchain. Permissioned blockchains such as, for example, Hyperledger Fabric ("HLF") can support xk transmissions per second ("tx/s"), requiring (e.g., "M*x signatures+N*x verification") operations per second such as, for example, some accelerators may become saturated.

Accordingly, the present invention provides a solution to manage and resolve a cryptographic bottleneck at shared cryptographic accelerators for M-out-of-N blockchain contracts by automatically switching between node cryptographic libraries and accelerator cryptographic libraries when the traffic at the accelerator exceeds a user defined threshold.

In one aspect, a user interface may be provided defining a cryptographic bottleneck threshold (e.g., the user defined threshold). One or more blockchain nodes may be allowed to interact directly with a cryptographic accelerator(s) library. Also, M-out-of-N requests may be scheduled in a queue for processing when the accelerator becomes available. A switching operation may be performed to allow a blockchain node to switch between its local cryptographic libraries and the cryptographic accelerator.

As used herein, blockchain nodes may be peer-to-peer ("p2p") members of a blockchain. A node signature may be a crypto-operation that a node performs when the node signs a transaction with the private key of the node. A node signature verification may be defined as a crypto-operation that a node performs when it verifies that the signatures of a transaction are correct with the node's public keys. As previously mentioned, the M-out-of-N contract is a transaction on the blockchain that requires a signature of M nodes and a verification from N nodes. For example, M-out-of-N contracts may include, for example, one or more endorsement policies in an HLF. A cryptographic bottleneck may be the queuing of cryptographic operations that generates operations delay.

In an addition aspect, the present invention provides a system for resolving cryptographic bottlenecks for distributed multi-signature contracts shared with cryptographic accelerators. One or more cryptographic bottlenecks of cryptographic requests at a cryptographic accelerator may be resolved by switching between a blockchain node cryptographic library and an accelerator cryptographic library upon a number of the cryptographic requests at the accelerator exceeding a defined threshold.

In an alternative aspect, the present invention provides a system for reducing the execution time of cryptographic functions in an HLF (e.g., by dynamically using cryptographic accelerator(s) for offloading the execution of cryptographic functions (e.g., sign, verify, etc.)). A pipeline of application modules may be developed that enables the integration of specialized cryptographic accelerators in the HLF. The availability of a cryptographic accelerator may be determined/identified from a set of installed accelerators to run the required cryptographic functions. The queue of a cryptographic function execution requests and schedules the execution from the queue as soon as an accelerator becomes available or when it is not affected by a cryptographic bottleneck.

Also, as used herein, a computing system may include large scale computing called "cloud computing" in which resources may interact and/or be accessed via a communications system, such as a computer network. Resources may be software-rendered simulations and/or emulations of computing devices, storage devices, applications, and/or other computer-related devices and/or services run on one or more computing devices, such as a server. For example, a plurality of servers may communicate and/or share information that may expand and/or contract across servers depending on an amount of processing power, storage space, and/or other computing resources needed to accomplish requested tasks. The word "cloud" alludes to the cloud-shaped appearance of a diagram of interconnectivity between computing devices, computer networks, and/or other computer related devices that interact in such an arrangement.

It should be noted that one or more computations or calculations may be performed using various mathematical operations or functions that may involve one or more mathematical operations (e.g., solving differential equations or partial differential equations analytically or computationally, using addition, subtraction, division, multiplication, standard deviations, means, averages, percentages, statistical modeling using statistical distributions, by finding minimums, maximums or similar thresholds for combined variables, etc.).

Other examples of various aspects of the illustrated embodiments, and corresponding benefits, will be described further herein.

It is understood in advance that although this disclosure includes a detailed description on cloud computing, implementation of the teachings recited herein are not limited to a cloud computing environment and/or computing systems associated with one or more vehicles. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random-access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
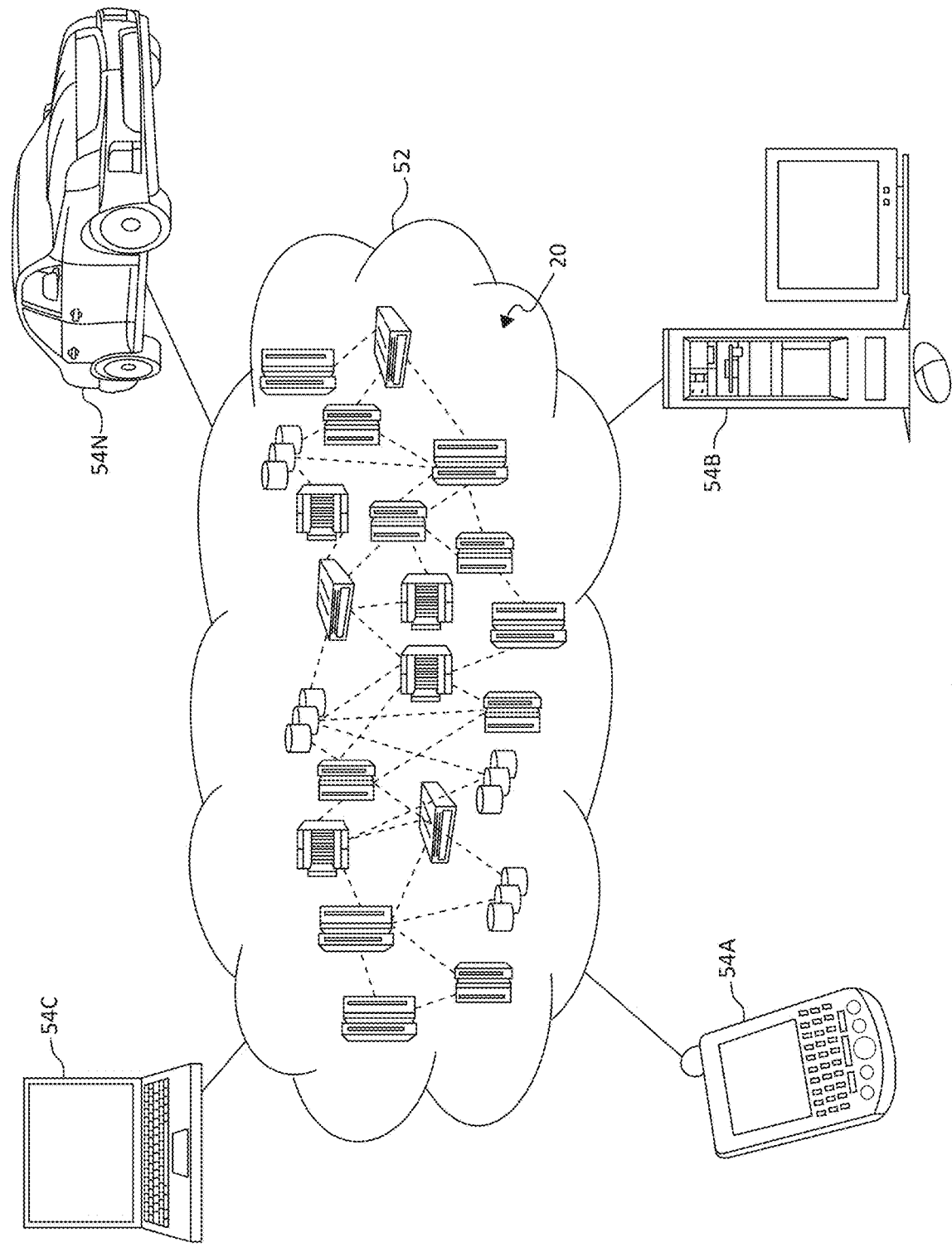
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
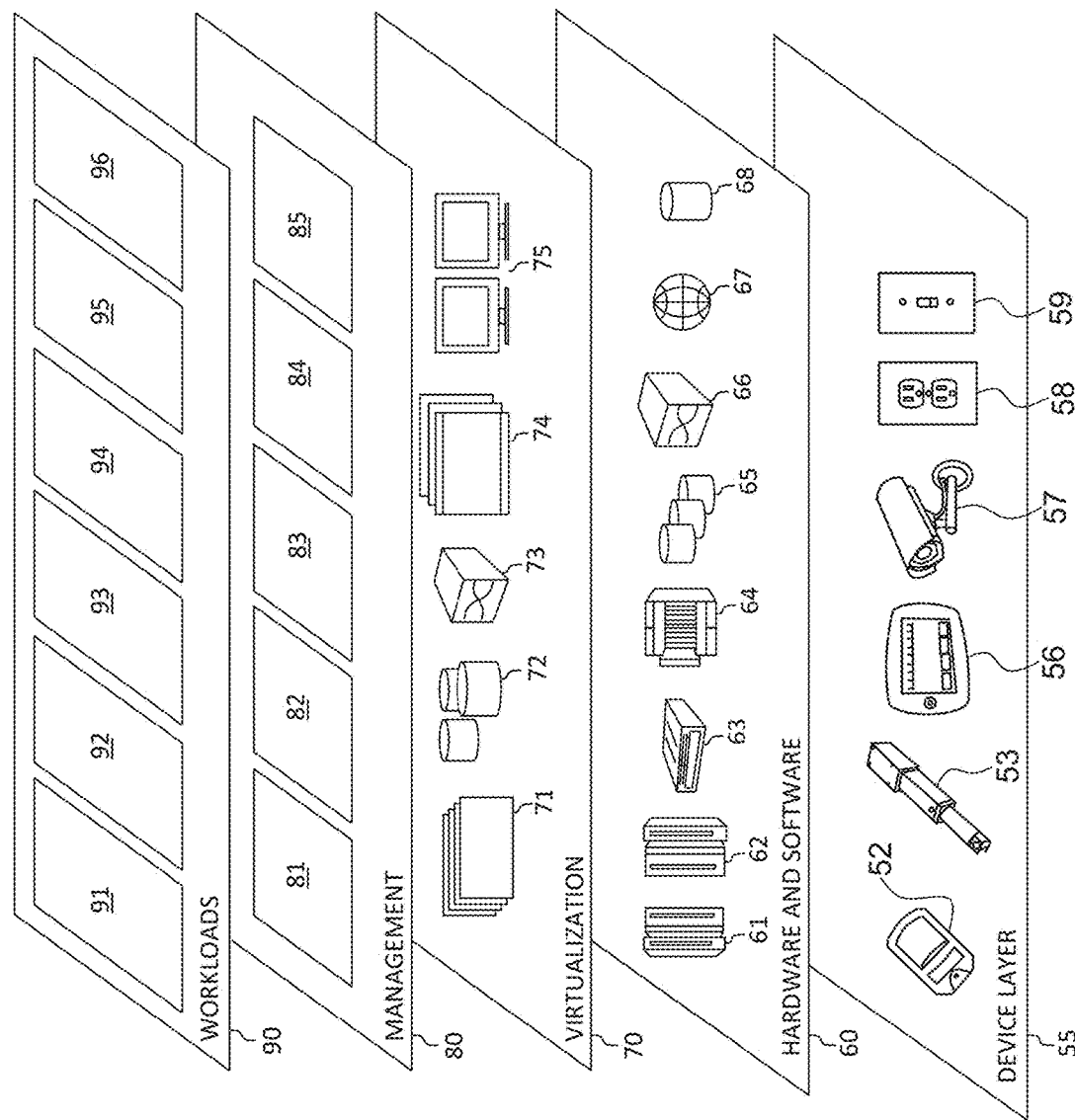
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote-control device), additional actuator devices, so called "smart" appliances such as a refrigerator or washer/dryer, and a wide variety of other possible interconnected objects.

Hardware and software layer 60 include hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for managing and resolving cryptographic bottlenecks for distributed multi-signature blockchain contracts. In addition, workloads and functions 96 for managing and resolving cryptographic bottlenecks for distributed multi-signature blockchain contracts may include such operations as data analytics, data analysis, and as will be further described, cryptographic switching functionality. One of ordinary skill in the art will appreciate that the workloads and functions 96 for managing and resolving cryptographic bottlenecks for distributed multi-signature blockchain contracts may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

Figure 4:
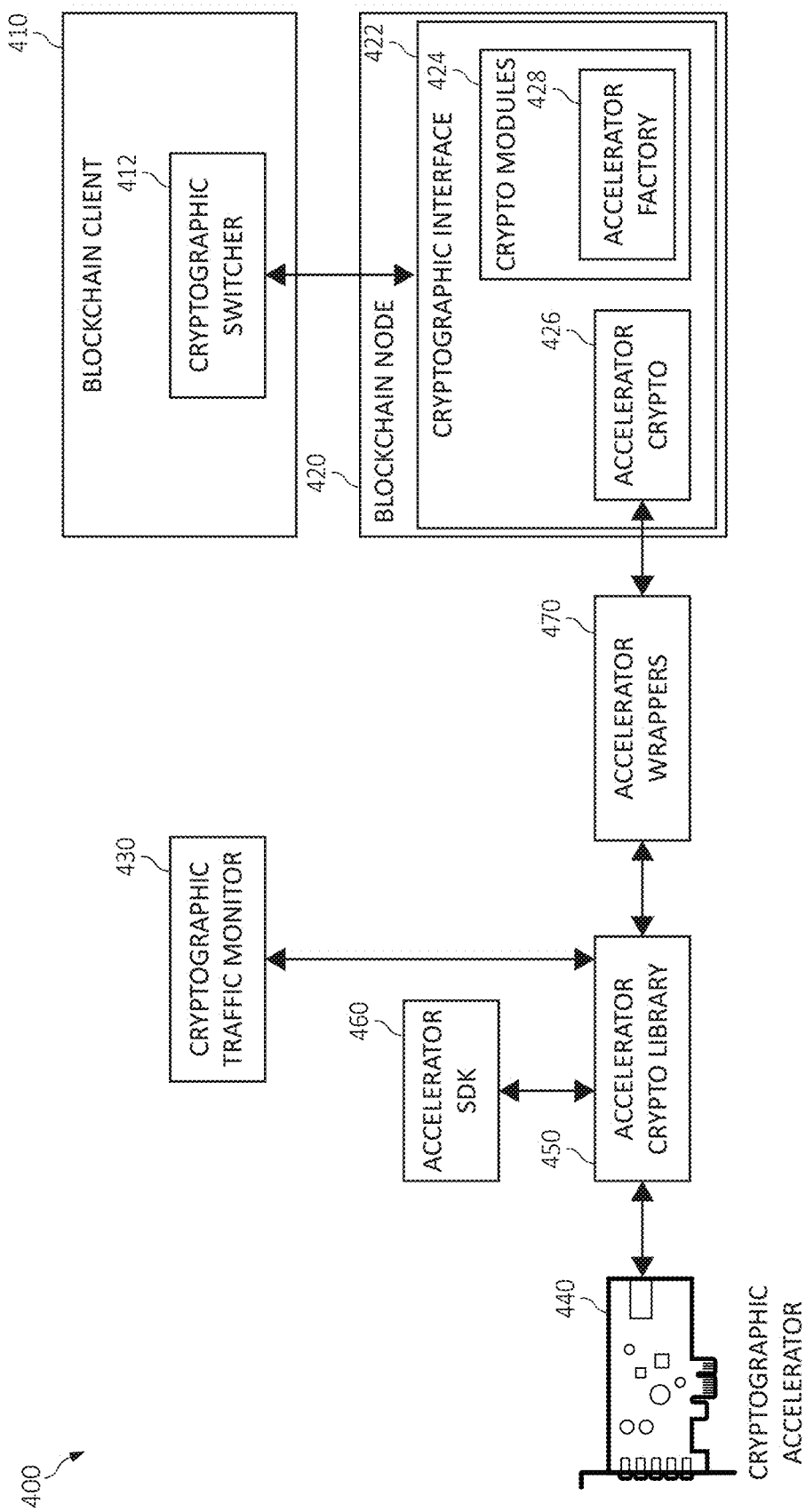
FIG. 4 is an additional block diagram depicting an exemplary functional relationship between various aspects of the present invention.

Turning now to FIG. 4, a block diagram depicting exemplary functional components 400 according to various mechanisms of the illustrated embodiments is shown. FIG. 4 illustrates a system 400 for managing and resolving cryptographic bottlenecks for distributed multi-signature blockchain contracts in a computing environment. As will be seen, many of the functional blocks may also be considered "modules" or "components" of functionality, in the same descriptive sense as has been previously described in FIGS.

1-3. With the foregoing in mind, the module/component blocks 400 may also be incorporated into various hardware and software components of a system for cognitive data curation in accordance with the present invention. Many of the functional blocks 400 may execute as background processes on various components, either in distributed computing components, or on the user device, or elsewhere.

In one aspect, the functional blocks 400 may include a block chain client 410, a blockchain node 420, a cryptographic traffic monitor 430, an accelerator ("SDK") 460, an accelerator cryptographic ("crypto") library 450, a cryptographic accelerator 440, and accelerator wrappers 470, each of which may be in communication with each other.

The block chain client 410 may include a cryptographic switcher 412 (e.g., "switch" or "switcher"). The blockchain node 420 may include the cryptographic interface 422 and the cryptographic modules 424, having an accelerator factory 428, and in communication with the accelerator cryptographic 426 (e.g., accelerator crypto). The accelerator wrappers 470 may in communication with both the accelerator cryptographic 426 and the accelerator cryptographic library 450.

In one aspect, the accelerator cryptographic library 450 may be an application component (e.g., software component) that interacts directly with the cryptographic accelerator(s) 440. The accelerator cryptographic library 450 may implement and export a required cryptographic function. The accelerator cryptographic library 450 may store a given request (e.g., a cryptographic request) in a queue and schedule the request for processing. The accelerator cryptographic library 450 may store the inputs of the cryptographic traffic monitor 430 and the cryptographic switcher 412. The accelerator cryptographic library 450 may leverage a specific accelerator SDK ("software development kit") 460 that provides high level application programming interfaces ("APIs") to program a specific accelerator specific to a type of accelerators.

The cryptographic traffic monitor 430 may be an application component (e.g., software component) that monitors each cryptographic request that a client is sending to the accelerator (e.g., cryptographic accelerator 440).

The cryptographic switcher 412 may be an application component (e.g., software component) that takes as inputs a user-defined threshold and sends an output to the accelerator cryptographic library 450 to determine/decide if to send the node request to the cryptographic accelerator 440 and/or to the nodes (e.g., the blockchain node 420).

The accelerator wrappers 470 may provide a wrapper around the functions implemented in the accelerator cryptographic library 450. In a select type of accelerators, the accelerator wrappers 470 may hides the notion of C/C++ implementation and would provide the same functionalities as the accelerator crypto library in go language using cgo directives.

The accelerator cryptographic 426 may implement functionalities and interfaces required to add a new cryptographic module in a blockchain. For example, in an HLF system, the accelerator cryptographic 426 may include implementing blockchain crypto service provider ("BCCSP") interfaces by using the functions exposed and implemented by a fabric wrapper module. The accelerator cryptographic 426 uses functions exported from a fabric wrapper component to implement one or more required functionalities.

The accelerator factory 428 may provide the implementation for adding a hardware accelerated cryptographic library for the blockchain. In HLF, the accelerator factory 428 implements a required BCCSP factory interface so that the target hardware accelerator implementation can be used by a hyperledger fabric.

Figure 5:
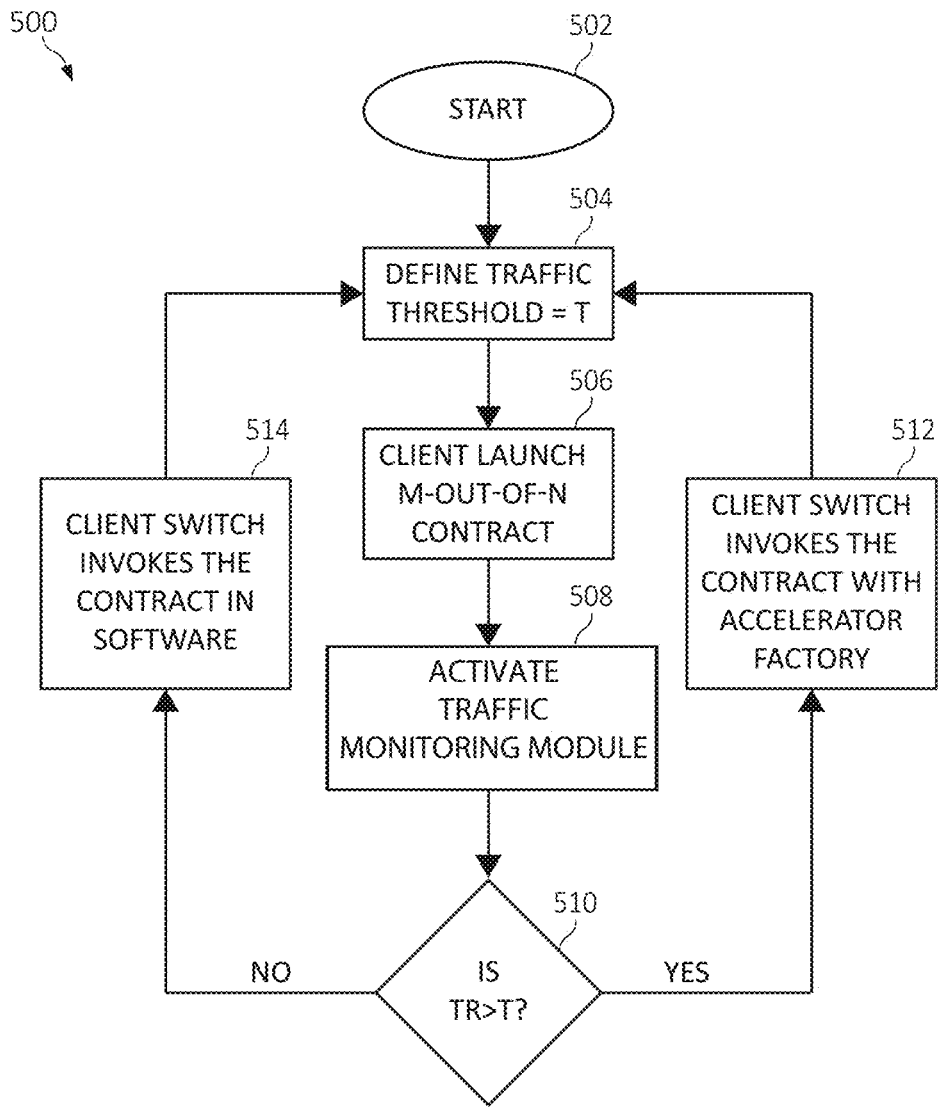
FIG. 5 is a flowchart diagram depicting an additional exemplary method for managing and resolving cryptographic bottlenecks for distributed multi-signature blockchain contracts by a processor in which aspects of the present invention may be realized.

Turning now to FIG. 5, a method 500 for managing cryptographic bottlenecks for distributed multi-signature blockchain contracts by a processor is depicted, in which various aspects of the illustrated embodiments may be implemented. The functionality 500 may be implemented as a method executed as instructions on a machine, where the instructions are included on at least one computer readable medium or one non-transitory machine-readable storage medium. Also, one or more components, functionalities, and/or features of FIGS. 1-4 may be implemented in FIG. 5. The functionality 500 may start in block 502.

A traffic threshold (e.g., a cryptographic bottleneck threshold "T") may be defined, as in block 504. A client may launch multi-signatures contract(s) ("M-out-of-N" contracts), as in block 506. A traffic monitoring module may be activated ("Tr"), as in block 508. A determination operation may be performed to determine if the amount of traffic "Tr" is greater than the defined threshold (e.g., is TR>T?), as in block 510. If no at block 510, a client switch (e.g., cryptographic switcher) may invoke the multi-signatures contract (e.g., "M-out-of-N" contract) in a software program/application, as in block 514. From block 514, the operations of functionality 500 may move to block 504. If yes at block 510, a client switch (e.g., cryptographic switcher) may invoke a particular one of the multi-signature contracts ("M-out-of-N" contract) with an accelerator factory, as in block 512. From block 512, the operations of functionality 500 may move to block 504.

Figure 6:
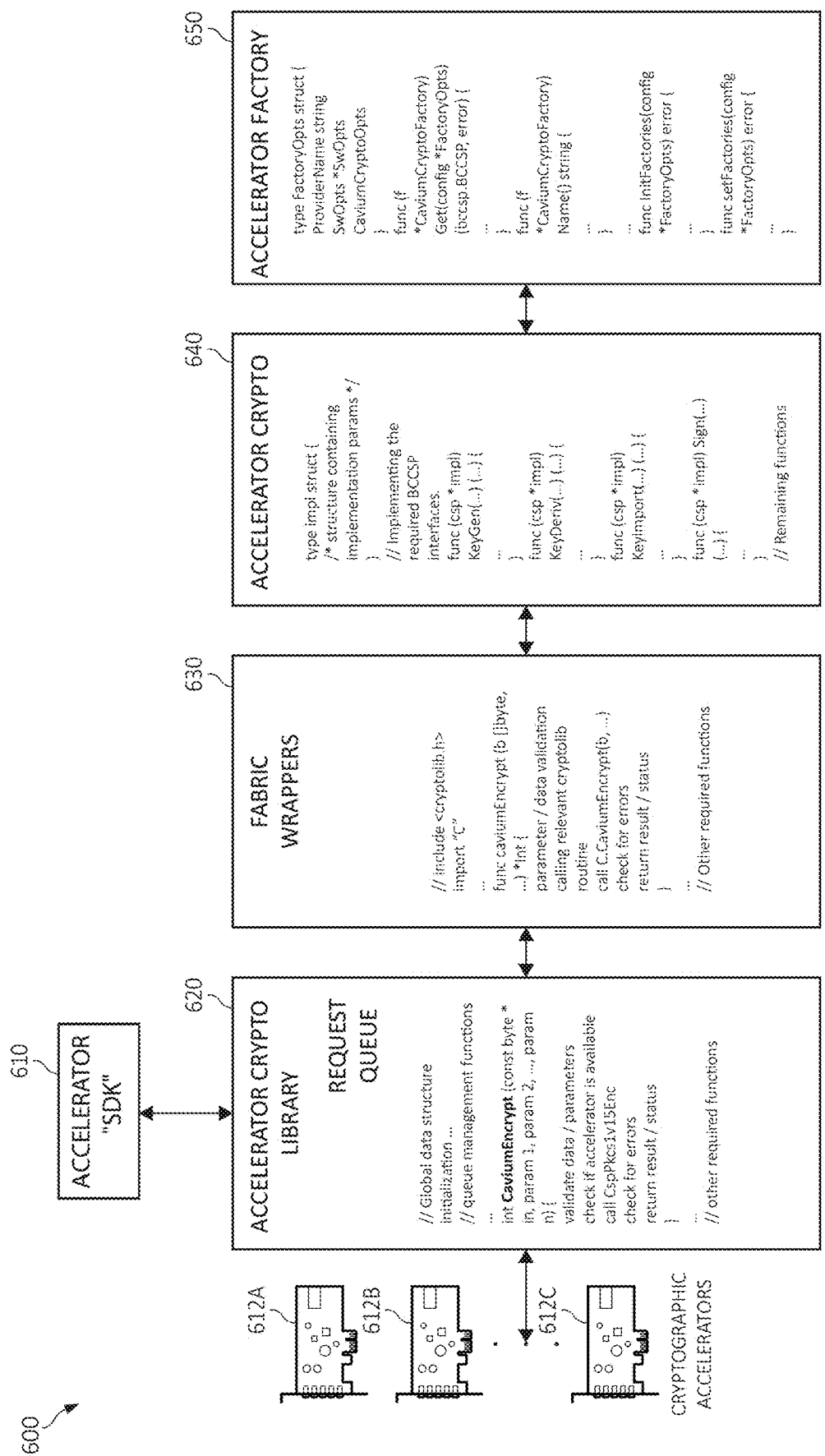
FIG. 6 is a block diagram depicting hyperledger fabric ("HLF") system architectures for managing and resolving cryptographic bottlenecks for distributed multi-signature blockchain contracts in which aspects of the present invention may be realized.

Turning now to FIG. 6, a block diagram depicting hyperledger fabric ("HLF") system architectures 600 for managing and resolving cryptographic bottlenecks for distributed multi-signature blockchain contracts according to various mechanisms of the illustrated embodiments is shown. Also, one or more components, functionalities, and/or features of FIGS. 1-5 may be implemented in FIG. 6. That is, FIG. 6 depicts, by way of example only, one or more cryptographic accelerators 612A-C in communication with an accelerator cryptographic ("crypto") library 620, one or more fabric wrappers 630, an accelerator cryptographic ("crypto") 640, and an accelerator factor 650, showing the various components and operations with included pseudo-code.

The accelerator cryptographic library 620 may validate one or more data/parameters and determine if one or more cryptographic accelerators 612A-C are available.

The accelerator cryptographic library 620 may leverage a specific accelerator (e.g. software development kit "SDK") 610 that provides high level application programming interfaces ("APIs") to program a specific type of accelerator.

The fabric wrappers 630 may provide a wrapper around the functions implemented in the accelerator cryptographic library 620 and may hide, for example, a notion of a computing programming language implementation (e.g., C/C++ implementation) and would provide the same functionalities as the accelerator crypto library in a selected computing programming language (e.g., Golang "Go" language using cgo directives such as, for example, where the CGO enables the creation of Go packages that call C software code).

The accelerator cryptographic ("crypto") 640 may implement functionalities and interfaces required to add a new cryptographic module in a blockchain. For example, in the HLF system 600, the accelerator cryptographic 640 may include implementing blockchain crypto service provider ("BCCSP") interfaces by using the functions exposed and implemented by one or more fabric wrappers 630 (e.g., fabric wrapper components). The accelerator crypto 640 uses functions exported from one or more fabric wrappers 630 to implement one or more required functionalities.

The accelerator factory 650 may provide the implementation for adding a hardware accelerated cryptographic library for the blockchain and in the HLF system 600. The accelerator factory 650 may implement a required BCCSP factory interface so that the target hardware accelerator implementation can be used by the HLF.

Figure 7:
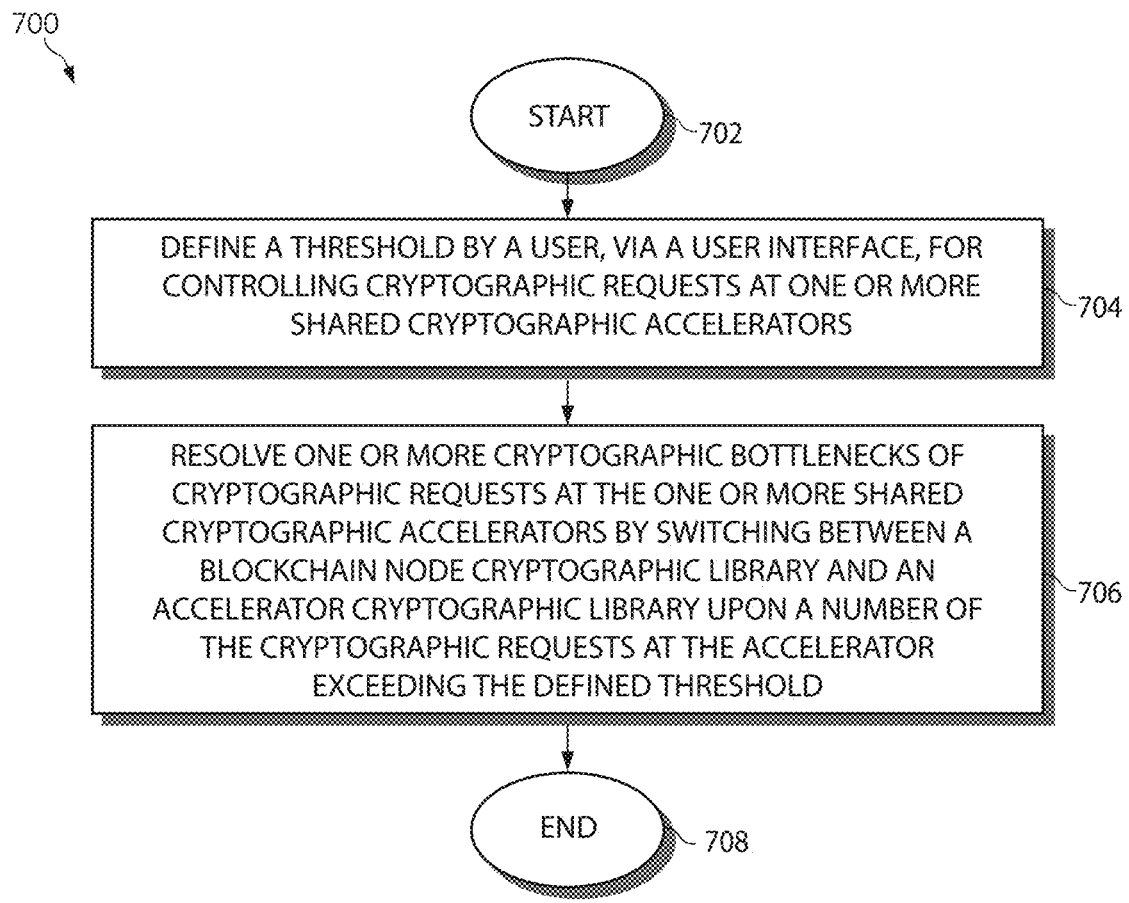
FIG. 7 is an additional flowchart diagram depicting an exemplary method for managing and resolving cryptographic bottlenecks for distributed multi-signature blockchain contracts by a processor, again in which aspects of the present invention may be realized.

Turning now to FIG. 7, a method 700 for managing cryptographic bottlenecks for distributed multi-signature blockchain contracts by a processor is depicted, in which various aspects of the illustrated embodiments may be implemented. The functionality 700 may be implemented as a method executed as instructions on a machine, where the instructions are included on at least one computer readable medium or one non-transitory machine-readable storage medium. The functionality 700 may start in block 702.

A threshold may be defined by a user (e.g., a defined threshold) via a user e c for controller cryptographic requests at one or more shared cryptographic accelerator accelerators, as in block 704. One or more cryptographic bottlenecks of cryptographic requests at a cryptographic accelerator may be resolved by switching between a blockchain node cryptographic library and an accelerator cryptographic library upon a number of the cryptographic requests at the accelerator exceeding a defined threshold, as in block 706. The functionality 700 may end, as in block 708.

In one aspect, in conjunction with and/or as part of at least one block of FIG. 7, the operations of method 700 may include each of the following. The operations of method 700 may enable a plurality of blockchain nodes to interact directly with the accelerator cryptographic library. The cryptographic requests may be multi-signature blockchain contracts requests. The operations of method 700 may schedule the cryptographic requests in a queue for processing by the cryptographic accelerator. The cryptographic accelerator may be shared between a plurality of blockchain nodes.

The operations of method 700 may enable a blockchain node to switch between the blockchain node cryptographic library and the accelerator cryptographic library, monitor one or more cryptographic requests sent from a block chain client associated with one or more blockchain nodes to the cryptographic accelerator, and/or send the one or more cryptographic requests by the accelerator cryptographic library to a blockchain node or the cryptographic accelerator.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method for managing cryptographic bottlenecks for distributed multi-signature blockchain contracts by a processor, comprising:
   generating one or more cryptographic requests by a blockchain client executing on a blockchain node and sending the one or more cryptographic requests to a cryptographic accelerator, in communication with the blockchain node, for processing;
   responsive to the generation and sending of the one or more cryptographic requests, determining, by a cryptographic monitoring application that a number of the one or more cryptographic requests pending at the cryptographic accelerator exceeds a defined threshold, indicating that one or more cryptographic bottlenecks of the one or more cryptographic requests exist at the cryptographic accelerator;
   responsive to determining the number of the one or more cryptographic requests exceeds the defined threshold, instructing, by the cryptographic monitoring application, the blockchain node to switch from a local cryptographic library of the blockchain node to an accelerator cryptographic library of the cryptographic accelerator; and
   resolving the one or more cryptographic bottlenecks by processing the one or more cryptographic requests by the blockchain node in lieu of processing the one or more cryptographic requests by the cryptographic accelerator, wherein the blockchain node uses a fabric wrapper implementing functions of the accelerator cryptographic library to perform the processing.

2. The method of claim 1, further including defining the defined threshold by a user via a user interface ("UI"), wherein the cryptographic requests are multi-signature blockchain contracts requests.

3. The method of claim 1, further including enabling a plurality of blockchain nodes, inclusive of the blockchain node, to interact directly with the accelerator cryptographic library via the fabric wrapper.

4. The method of claim 3, further including scheduling the one or more cryptographic requests in a queue for processing by the cryptographic accelerator, wherein the cryptographic accelerator is shared between the plurality of blockchain nodes.

5. The method of claim 1, further including monitoring traffic between the blockchain node and the cryptographic accelerator by the blockchain client to detect that the number of the one or more cryptographic requests at the cryptographic accelerator exceeds the defined threshold.

6. The method of claim 1, further including sending the one or more cryptographic requests by the accelerator cryptographic library to the blockchain node or the cryptographic accelerator.

7. A system managing cryptographic bottlenecks for distributed multi-signature blockchain contracts in a computing environment, comprising:
   one or more computers with executable instructions that when executed cause the system to:
      generate one or more cryptographic requests by a blockchain client executing on a blockchain node, and send the one or more cryptographic requests to a cryptographic accelerator, in communication with the blockchain node, for processing;
      responsive to the generation and sending of the one or more cryptographic requests, determine, by a cryptographic monitoring application whether a number of the one or more cryptographic requests pending at the cryptographic accelerator exceeds a defined threshold, indicating that one or more cryptographic bottlenecks of the one or more cryptographic requests exist at the cryptographic accelerator;
      responsive to determining the number of the one or more cryptographic requests exceeds the defined threshold, instruct, by the cryptographic monitoring application, the blockchain node to switch from a local cryptographic library of the blockchain node to an accelerator cryptographic library of the cryptographic accelerator; and
      resolve the one or more cryptographic bottlenecks by processing the one or more cryptographic requests by the blockchain node in lieu of processing the one or more cryptographic requests by the cryptographic accelerator, wherein the blockchain node uses a fabric wrapper implementing functions of the accelerator cryptographic library to perform the processing.

8. The system of claim 7, wherein the executable instructions define the defined threshold by a user via a user interface ("UI"), wherein the cryptographic requests are multi-signature blockchain contracts requests.

9. The system of claim 7, wherein the executable instructions enable a plurality of blockchain nodes, inclusive of the blockchain node, to interact with the accelerator cryptographic library via the fabric wrapper.

10. The system of claim 9, wherein the executable instructions schedule the one or more cryptographic requests in a queue for processing by the cryptographic accelerator, wherein the cryptographic accelerator is shared between the plurality of blockchain nodes.

11. The system of claim 7, wherein the executable instructions monitor traffic between the blockchain node and the cryptographic accelerator by the blockchain client to detect that the number of the one or more cryptographic requests at the cryptographic accelerator exceeds the defined threshold.

12. The system of claim 7, wherein the executable instructions send the one or more cryptographic requests by the accelerator cryptographic library to the blockchain node or the cryptographic accelerator.

13. A computer program product for managing cryptographic bottlenecks for distributed multi-signature blockchain contracts by a processor in a computing environment, the computer program product comprising a non-transitory computer-readable storage medium having computer-readable program code portions stored therein, the computer-readable program code portions comprising:
   an executable portion that generates one or more cryptographic requests by a blockchain client executing on a blockchain node and sends the one or more cryptographic requests to a cryptographic accelerator, in communication with the blockchain node, for processing;
   an executable portion that, responsive to the generation and sending of the one or more cryptographic requests, determines, by a cryptographic monitoring application whether a number of the one or more cryptographic requests pending at the cryptographic accelerator exceeds a defined threshold, indicating that one or more cryptographic bottlenecks of the one or more cryptographic requests exist at the cryptographic accelerator;
   an executable portion that, responsive to determining the number of the one or more cryptographic requests exceeds the defined threshold, instructs, by the cryptographic monitoring application, the blockchain node to switch from a local cryptographic library of the blockchain node to an accelerator cryptographic library of the cryptographic accelerator; and
   an executable portion that resolves the one or more cryptographic bottlenecks by processing the one or more cryptographic requests by the blockchain node in lieu of processing the one or more cryptographic requests by the cryptographic accelerator, wherein the blockchain node uses a fabric wrapper implementing functions of the accelerator cryptographic library to perform the processing.

14. The computer program product of claim 13, further including an executable portion that defines the defined threshold by a user via a user interface ("UI"), wherein the cryptographic requests are multi-signature blockchain contracts requests.

15. The computer program product of claim 13, further including an executable portion that enables a plurality of blockchain nodes, inclusive of the blockchain node, to interact with the accelerator cryptographic library via the fabric wrapper.

16. The computer program product of claim 15, further including an executable portion that schedules the one or more cryptographic requests in a queue for processing by the cryptographic accelerator, wherein the cryptographic accelerator is shared between the plurality of blockchain nodes.

17. The computer program product of claim 13, further including an executable portion that:
   monitors traffic between the blockchain node and the cryptographic accelerator by the blockchain client to detect that the number of the one or more cryptographic requests at the cryptographic accelerator exceeds the defined threshold; or
   sends the one or more cryptographic requests by the accelerator cryptographic library to the blockchain node or the cryptographic accelerator.

\* \* \* \* \*